United States Patent
Zimmermann et al.

(10) Patent No.: US 6,522,700 B1
(45) Date of Patent: Feb. 18, 2003

(54) METHOD AND SYSTEM FOR THE OFDM MULTICARRIER TRANSMISSION OF DIGITAL BROADCASTING SIGNALS

(75) Inventors: Gerd Zimmermann, Weiterstadt (DE); Henrik Schulze, Meschede (DE)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 09/142,807
(22) PCT Filed: Mar. 5, 1997
(86) PCT No.: PCT/EP97/01090
§ 371 (c)(1),
(2), (4) Date: Feb. 8, 1999
(87) PCT Pub. No.: WO97/34382
PCT Pub. Date: Sep. 18, 1997

(30) Foreign Application Priority Data

Mar. 14, 1996 (DE) .......................................... 196 09 909

(51) Int. Cl.⁷ ............................................... H04L 27/04
(52) U.S. Cl. ...................................... 375/295; 345/308
(58) Field of Search ................................. 375/260, 295, 375/308, 279–281; 455/59; 370/203–211; 381/3

(56) References Cited

U.S. PATENT DOCUMENTS

| | | | |
|---|---|---|---|
| 4,615,040 A | 9/1986 | Mojoli et al. | 375/285 |
| 5,406,551 A | 4/1995 | Saito et al. | 370/208 |
| 5,416,801 A * | 5/1995 | Chouly et al. | 375/260 |
| 6,151,296 A * | 11/2000 | Vijayan et al. | 370/208 |
| 6,317,456 B1 * | 11/2001 | Sayeed | 375/227 |

FOREIGN PATENT DOCUMENTS

| | | |
|---|---|---|
| DE | 37 23 343 | 2/1989 |
| DE | 41 28 713 | 3/1993 |
| DE | 43 06 590 A | 3/1994 |
| DE | 42 40 226 A | 4/1994 |
| DE | 43 19 769 | 7/1994 |
| DE | 43 15 806 | 11/1994 |
| DE | 43 19 217 | 12/1994 |
| DE | 44 25 713 | 4/1995 |
| EP | 0 531 046 A | 3/1993 |
| EP | 0 540 232 A | 5/1993 |
| WO | 88 00417 A | 1/1988 |

OTHER PUBLICATIONS

William Y. Zou et al., "COFDM: An Overview" IEEE transaction, 1995, pp1–8.*
L. Hanzo et al., "A Mobile Hi–Fi Digital Audio Broadcasting Scheme," IEEE, 1994, pp 1035–1039.*
J. Nicholas Laneman et al., "Reed–Solomon Decoding Algorithim for Digital Audio Broadcasting in the AM Band," IEEE transaction on Broadcasting, 2001, pp 115–122.*
J. Egle et al., "MC–CDM–A Performance Approach For Digital Broadcasting in the AM–Band," IEE, HF Radio System and Technique Pub. , pp 59–63.*
K. Sathanathan et al., "Analysis of OFDM in the presence of Frequency Offset and a method to Reduce Performance Degradation," IEEE, pp 72–76.*

(List continued on next page.)

*Primary Examiner*—Tesfaldet Bocure
(74) *Attorney, Agent, or Firm*—Kenyon & Kenyon (57) ABSTRACT

An improved DAB transmission system with which a higher net data rate can be achieved while maintaining the same system quality, or the same system quality can be achieved with a much lower signal-to-noise ratio on the receiver side at the same net data rate. A symbol mapper is connected directly downstream from a convolution encoder instead of to the block generator; as in the case of prior DAB systems. A multi-stage channel encoder, to which the data substreams of a source data stream are distributed, is used. The source data stream is processed on the complex symbol level and not on the bit level, as in the case of prior DAB systems.

23 Claims, 4 Drawing Sheets

OTHER PUBLICATIONS

J P 4–196822 A., Patents Abstracts of Japan, E–1286. Oct. 28, 1992, vol. 16, No. 526.

Von Volker Engels, et al., "OFDM–Übertragungsverfahren Für Den Digitalen Fernsehrundfunk," Rundfunktech, Mitteilungen, Jg. 37, 1993, H. 6, pp. 260–270.

Volker Engels, et al., "Multilevel Differential Modulation Techniques (64–DAPSK) for Multicarrier Transmission Systems," ETT, vol. 6, No. 6, Nov.–Dec., 1995, pp. 633–640.

YongHo Kim, et al., "Reduced–state sequence estimation of OFDM signal in frequency selective Rayleigh fading channels," Electronics Letters, vol. 31, No. 21, Oct. 12, 1995, pp. 1802–1803.

Von Henrik Schulze, "Digital Audio Broadcasting (DAB)— Stand der Entwicklung," Bosch Technische Berichte, 1991, Heft 54, pp. 17–25.

* cited by examiner

METHOD AND SYSTEM FOR THE OFDM MULTICARRIER TRANSMISSION OF DIGITAL BROADCASTING SIGNALS

FIELD OF THE INVENTION

The present invention concerns a method and system for the OFDM orthogonal frequency division multiplexing multicarrier transmission of digital broadcasting signals, in particular for digital audio broadcasting and for digital value-added services.

RELATED TECHNOLOGY

The DAB (digital audio broadcasting) transmission system was developed over the past few years for terrestrial digital audio broadcasting. The known system is suitable for transmitting high-quality audio programs to mobile, portable, and stationary receivers. It is also generally possible to transmit additional data at relatively low data rates over the DAB transmission system, for example information accompanying the program or traffic information. Multiple audio programs and data services are combined into a DAB ensemble and broadcast together at a transmit frequency using a selected coded orthogonal frequency division multiplexing (COFDM) method. The known DAB transmission system can currently be used to transmit a maximum effective net data rate of 1728 Kbps. Due to rapid developments in the multimedia field, there is great interest in transmitting added-value services, such a video programs, at higher data rates, which can exceed the current effective net data rate of 1728 Kbps. However, the conventional DAB system is unsuitable, in particular, for mobile reception of higher-speed data, since the error protection mechanism used is mot sufficiantyl effective.

SUMMARY OF THE IVENTION

An object of the present invention is therefore to further develop the existing DAB transmission system so that added-value services, such as video programs, can be transmitted at higher data rates without impairing the transmission quality.

The present invention provides a digital OFDM multicarrier transmission system that is based on the existing DAB transmission system with improved system performance. At the same time, attention was paid to the ability to use known hardware components from the existing DAB transmission system when designing the digital OFDM multicarrier transmission system, making it possible to easily incorporate the present invention into an existing DAB transmission system. For convenience, the transmission system according to the present invention is denoted as the X-DAB transmission system. "X-DAB" stands for extended, or enhanced, digital audio broadcasting system. It should be noted at the outset that the X-DAB transmission system can be used to advantageously transmit high-speed data signals, such as video signals, to mobile receivers along with audio programs, even though this cannot be done with a conventional DAB transmission system at a sufficient level of quality.

With the method according to the present invention for the OFDM multicarrier transmission of digital broadcasting signals, at least one source data stream, which is split into several frames of a predetermined length, is generated, as with the known DAB system. In order to considerably improve system performance compared to the DAB transmission system, the source data stream is broken down into N parallel data substreams, each of which is supplied to a separate channel encoder having a predetermined code rate. Each channel encoder supplies an encoded, preferably convolution-encoded, sequence of M bits at its output. The bits of the N encoded parallel data substreams are each combined into an N-tuple, i.e., a group or a vector of N bits, and mapped to a complex symbol of a $2^N$-PSK symbol alphabet. This encoded modulation technique is essentially known. A difference compared to the existing DAB transmission system is that the X-DAB transmission system processes complex symbols or their N-bit addresses instead of individual bits immediately after channel encoding of the source data stream. It has been determined that the improved system characteristics are, in fact, due to this measure. Consequently, complex symbols, and not individual bits, are combined into blocks of a predetermined size. As with the known DAB transmission system, in which, however, bits are mapped to complex symbols only after blocks are generated, the complex symbols in each block are each assigned to different subcarriers. An analog OFDM signal is then generated from the complex symbols in each block and transmitted to receiving equipment.

To avoid transmission errors caused by the time-discriminating characteristics of a mobile radio channel, the complex symbols are time-interleaved prior to block generation. Note that individual bits, and not complex symbols, are time-interleaved in the known DAB transmission system. To eliminate signal impairment caused by a frequency-discriminating mobile radio channel, the complex symbols in each block are frequency-interleaved after block generation, which is also the case in a known DAB broadcasting system. The goal of time- and frequency-interleaving is to transmit adjacent signal elements as far apart from each other as possible, thereby avoiding grouping errors in adjacent information elements.

The complex symbols in each block undergo an essentially known differential modulation on each subcarrier.

In contrast to the known DAB transmission system, in which the subcarriers in each block undergo a 4-PSK modulation, the X-DAB transmission system according to the present invention carries out a $2^N$-PSK modulation on the subcarriers, with N being set to a value greater than or equal to 3. Although the present invention uses a higher modulation method than the known DAB transmission system (at least 8-PSK), the system quality does not deteriorate, as would be expected, with a constant signal-to-noise ratio on the receiver side. This is due to the symbol mapping function, which is performed earlier than in the known DAB transmission system.

In addition to improved system characteristics, the digital OFDM multicarrier transmission system according to the present invention is characterized by its downward compatibility with the conventional DAB system. Downward compatibility means that the X-DAB transmission system according to the present invention can be embedded into an existing DAB transmission system, making it possible to transmit DAB programs and X-DAB programs in a shared transmission frame. The ability of the two transmission systems to coexist is achieved by using the same parameters for the OFDM method, including those for frequency interleaving and differential modulation. In order to minimize the additional hardware and software needed for implementing the OFDM multicarrier transmission system according to the present invention, the convolution encoder, convolution decoder, time interleaver, and time deinterleaver known from the DAB system are also used.

A receiving device, which is initially designed like a DAB receiver, is provided for receiving an OFDM signal. The known modules include an OFDM demodulator with an A/D converter and a device for performing a discrete Fourier transform of the OFDM signal, a differential demodulator, and a frequency deinterleaver. Instead of converting the OFDM signal to a bit stream and subsequently supplying it to a device for removing the block structure, as in the case of known DAB receivers, the complex symbols themselves are supplied to a device which eliminates the block structure. The stream of complex symbols is supplied to a demultiplexer for time-division demultiplexing of the complex symbols from different source data streams. A time deinterleaver reverses the time interleaving of the complex symbols. In contrast to a known DAB receiver, the data streams undergo channel decoding on the complex symbol level, and not bit-by-bit. For this purpose, the complex receiving symbols are applied to N parallel-connected metric calculators. A convolution decoder is connected downstream from each metric calculator. The convolution decoder outputs are fed back to the metric calculators via assigned complementary convolution encoders according to a selected symbol mapping rule executed on the transmitter side, such as a natural mapping or pragmatic mapping rule. The decoded data substreams are present at the output of each convolution decoder. The individual data substreams are supplied to a source decoder for further processing.

BRIEF DESCRIPTION OF THE DRAWINGS

The present invention is elucidated below with reference to the drawings, in which.

DETAILED DESCRIPTION

Figure 1:
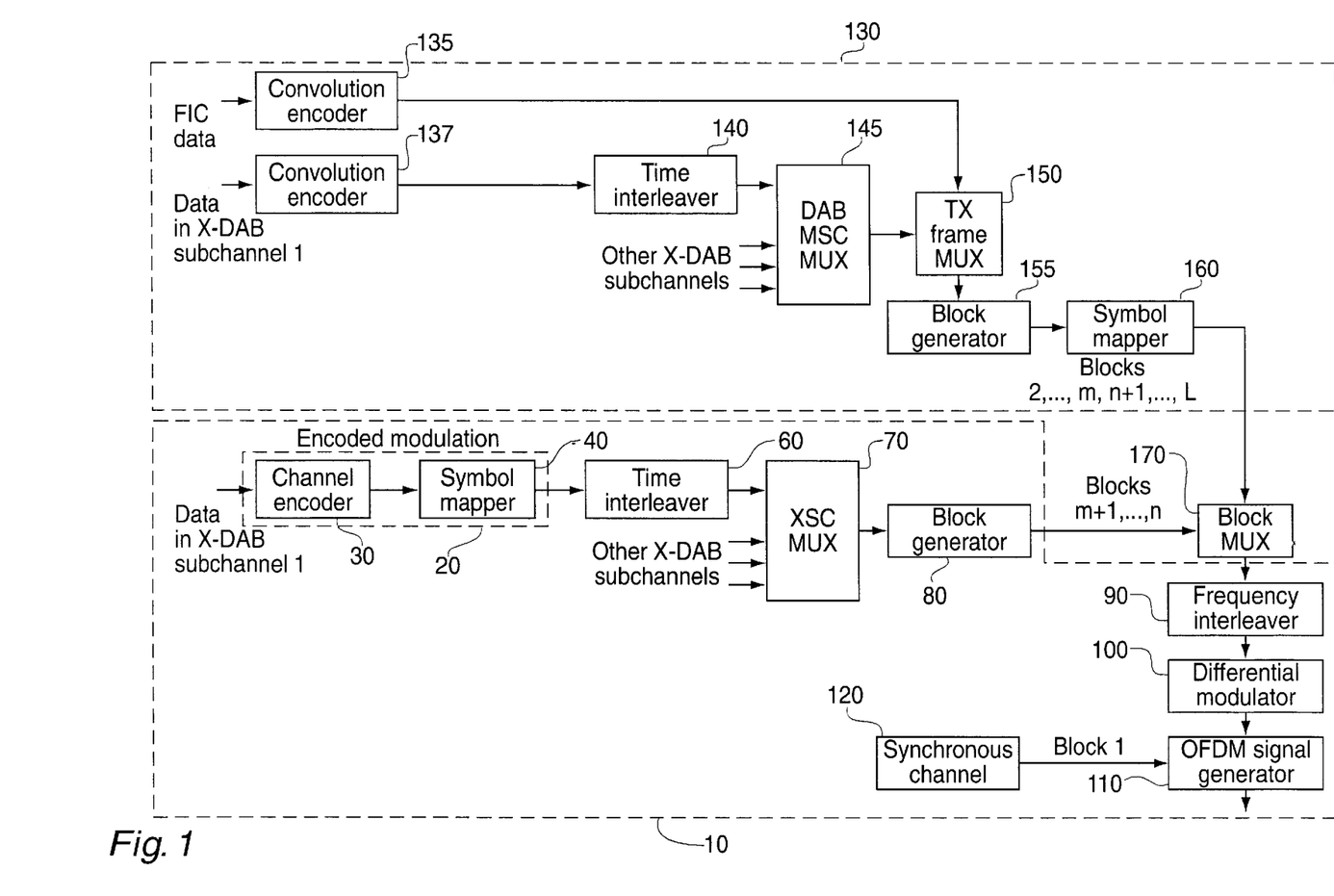
FIG. 1 shows the block diagram on the transmitter side of a known DAB transmitter to which a digital OFDM multicarrier transmitter according to the present invention is connected.

FIG. 1 shows the transmitter side of a digital OFDM multicarrier transmission system in which the present invention is implemented. 10 designates, in general, the digital OFDM multicarrier transmitter according to the present invention, referred to below as the X-DAB transmitter. X-DAB transmitter 10 has at least one essentially known device 20 for the encoded modulation of a source data stream. The number of parallel-connected encoding modulators 20 depends on the number of different source data streams to be broadcast by X-DAB transmitter 10. The source data stream coming from a source (not shown), which can be an MPEG video signal with a high data rate, is divided into multiple logical frames of a predetermined length. Each logical frame is mapped to part of a transmission frame, such as, for example, the one shown in FIG. 4.

The example assumes a transmission frame duration of 24 ms, with each frame containing L=76 OFDM symbols. Each OFDM symbol includes 384 subcarriers, each of which carries a complex symbol from a selected symbol alphabet, e.g., an 8-PSK symbol alphabet. To simplify and clarify this representation, FIG. 1 shows only one encoding modulator 20. Each encoding modulator 20 contains multiple parallel-connected convolution encoders 32, 34, and 36, all of which are known. The number of parallel-connected convolution encoders depends on the number of data substreams into which a source data stream is to be divided. Dividing each source data stream frame into three data substreams, which can be of different lengths, has proven to be advantageous. The three parallel data substreams of the source data stream, identified below by 0, 1, and 2, are supplied to convolution encoder 32, convolution encoder 34, and convolution encoder 36 and convolution-encoded at a predetermined code rate. The code rate of each convolution encoder must be selected according to an optimization criterion. In doing this, note that each convolution encoder 32, 24, and 36 introduces enough redundancy into each data substream to facilitate error correction in the receiver. The rate-compatible point convolution codes (RCPC) used in a known DAB transmitter can also generally be used for encoding the information bits of each data substream. This simplifies the development and layout not only of X-DAB transmitter 10, but of an X-DAB receiver as well, because the Viterbi decoder implemented in DAB receivers can also be used in an X-DAB receiver. Each data substream contains a number of bits, the sum of which equals the number of bits in one logical source data stream frame. This only requires that each convolution encoder 32, 34, and 26 generate one encoded data substream with M bits per logical frame. The outputs of convolution encoders 32, 34, and 36 are connected to the inputs of a symbol mapper 40.

Figure 2:
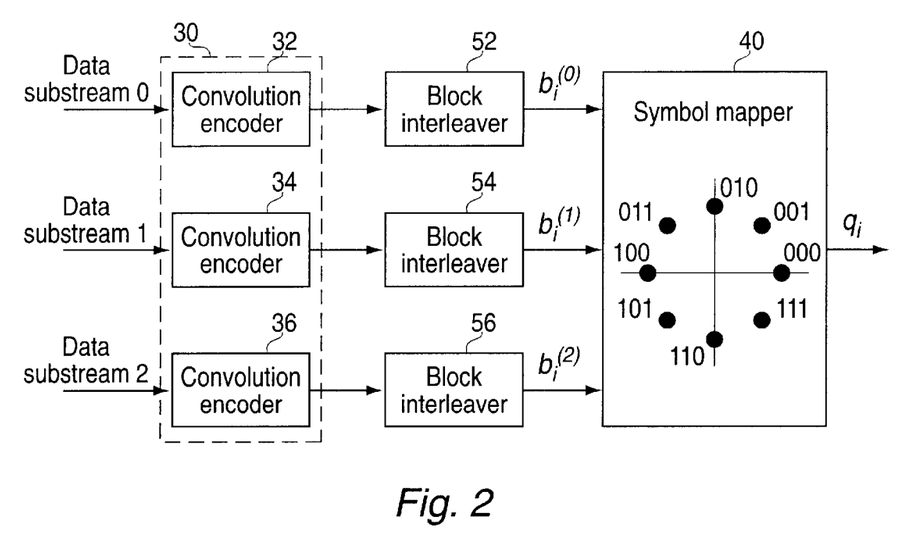
FIG. 2 shows a three-stage encoding modulator according to FIG. 1.

FIG. 2 shows encoding modulator 20, whose function is explained in detail below. Data substream 0 is applied to convolution encoder 32, data substream 1 to convolution encoder 34, and data substream 2 to convolution encoder 36. Each convolution encoder ensures that one encoded data substream with M bits is present at its output. An essentially known block interleaver can be series-connected to each convolution encoder. In particular, block interleaver 52 follows convolution encoder 32, block interleaver 54 follows convolution encoder 34, and block interleaver 56 follows convolution encoder 36. However, the use of a block interleaver is optional. As shown in FIG. 2, the outputs of convolution encoders 32, 34, and 36 are connected to symbol mapper 40 via block interleavers 52, 54, and 56. The bits of each encoded data substream present at the outputs of convolution encoders 32, 34, and 36 are combined successively into a group or a vector having three bits $b_i^{(o)}$, $b_i^{(1)}$, $b_i^{(2)}$. Symbol mapper 40 is implemented, for example, so that it can map a 3-bit tuple to a complex symbol of an 8-PSK symbol alphabet. Symbol mapper 40 thus performs an 8-PSK modulation function. Encoding modulator 20 provides complex symbols of an 8-PSK symbol alphabet at its output, with the complex symbols themselves or, more suitably their 3-bit addresses, being further processed.

Figure 5:
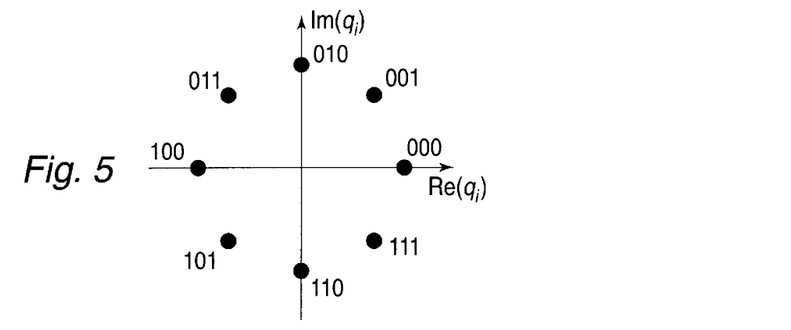
FIG. 5 shows a natural mapping rule executed by the symbol mapper.
Figure 6:
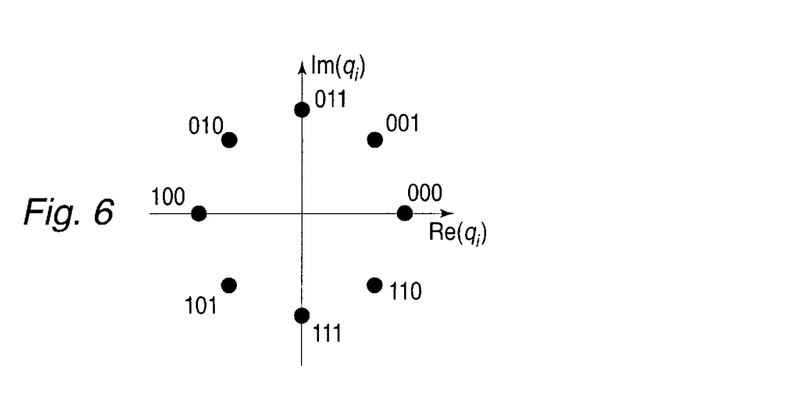
FIG. 6 shows an alternative mapping rule, known as pragmatic mapping, which can be executed by the symbol mapper.

FIGS. 5 and 6 show two alternative mapping rules for an 8-PSK modulation. FIG. 5 shows the natural mapping rule, while FIG. 6 shows the pragmatic mapping rule. As explained in greater detail below, the implementation of an X-DAB receiver depends on which mapping rule is selected. The design of three-stage channel encoder 30 and the mapping rule used must be coordinated with one another in relation to an optimization criterion, e.g., the minimum bit error rate that can be achieved after decoding in the receiver.

The complex symbols present at the output of symbol mapper 40, which can also be represented as a 3-bit address, are applied to an essentially known time interleaver 60. A feature of X-DAB transmitter 10 is that time interleaver 60 does not time-interleave individual bits, as in the case of a known DAB transmitter, but rather the individual complex symbols or their 3-bit addresses. If multiple source data streams are to be transmitted simultaneously, multiple parallel branches, also known as X-DAB subchannels, must be provided. Each branch contains one encoding modulator 20 as well as one time interleaver 60 and is connected to the input of an XSC frame multiplexer 70. "XSC" (X-DAB service channel) refers to the service channel of X-DAB transmitter 10 in the transmission frame shown in FIG. 4. To the output of XSC frame multiplexer 70 a further frame multiplexer (not shown) can be connected which incorporates processed control data into the transmission frame shown in FIG. 4 via a further (not shown) encoding modulator 20 without a downstream time interleaver 60. As shown in FIG. 1, the output of XSC multiplexer 70 is connected to the input of an essentially known block generator 80. Block generator 80 is used to combine the complex symbols representing one OFDM symbol into a block. Blocks which include a predetermined number of complex symbols are present at the output of block generator 80. In the example, each block contains 384 complex symbols, which corresponds to the number of subcarriers in an OFDM symbol. It is important to know that, unlike a known DAB transmitter, block generator 80 does not combine individual bits, but rather complex symbols, i.e., bit groups. The output of block generator 80 can be connected directly to the input of an essentially known frequency interleaver 90. Frequency interleaver 90 is used to eliminate signal noise caused by the frequency-discriminating characteristics of the mobile radio channel. A differential modulator 100 is connected downstream from frequency interleaver 90. Differential modulator 100 is used to modulate the subcarriers of each block containing the complex symbols. Each modulated subcarrier of a block is supplied to an essentially known OFDM signal generator 110. The purpose of OFDM signal generator 110 is to generate the analog OFDM signal from the modulated subcarriers of each block. In other words, OFDM signal generator 110 supplies one OFDM signal per block which can be viewed as a cumulative signal of the individual subcarriers. OFDM signal generator 110 usually includes a device for performing an inverse discrete Fourier transform and a D/A converter. The OFDM signal present at the output of OFDM signal generator 110 can be broadcast to numerous receiving devices via a transmitting device. Note that frequency interleaver 90, differential modulator 100, and OFDM signal generator 110 all operate in much the same manner as the corresponding function units of a known DAB transmitter.

As shown in FIG. 1, X-DAB transmitter 10 is incorporated into a known DAB transmitter. The known DAB transmitter contains the known components forming a transmitter part 130, in particular a convolution encoder 135 for encoding control data, a convolution encoder 137 for encoding a source data stream, a time interleaver 140, a DAB-MSC frame multiplexer, an additional frame multiplexer 150, a block generator 155, a symbol mapper 160, as well as frequency interleaver 90, differential modulator 100, and OFDM signal generator 110, which are shared by the DAB transmitter and X-DAB transmitter 10. However, it should be noted that symbol mapper 160 is connected downstream from block generator 155. Consequently, convolution encoder 137, time interleaver 140, and block generator 155 of known DAB transmitter 130, 90, 100, and 110 process the data stream bit-by-bit and not in the form of complex symbols. A block multiplexer 170, which incorporates the blocks of X-DAB transmitter 10 and the blocks of the DAB transmitter into the transmission frames shown in FIG. 4 in a predetermined manner, is provided in order to integrate X-DAB transmitter 10 according to the present invention into known DAB transmitter 130, 90, 100, and 110.

FIG. 1 also shows a device 120 for generating synchronization data which is also connected to OFDM signal generator 110.

The layout of a transmission frame which can be generated by the DAB and X-DAB transmitters shown in FIG. 1 will now be examined. The transmission frame shown in FIG. 4 may include, for example, L=76 blocks corresponding to the 76 OFDM symbols. Each transmission frame is divided into three sequential parts: the synchronization channel, which is generated in synchronization channel generator 120 and occupies the first block in the frame; control channel FIC (fast information channel), which occupies blocks 2 through 1+1; and main service channel MSC, which is contained in blocks 1+2 through L. For simplicity, the diagram does not show any null symbol in the synchronization channel. In main service channel MSC, the audio programs and data services can be embedded into the subchannels assigned to the various data sources. Because the layout of the synchronization and control channels is advantageously identical in both the DAB transmitter and X-DAB transmitter 10, the information contained therein can be evaluated by a known DAB receiver as well as by an X-DAB receiver according to the present invention. At least part of main service channel MSC is occupied by an XSC channel, which can contain, for example, the higher-speed video data from one or more sources or subchannels to be transmitted by X-DAB transmitter 10. The subchannels to be transmitted in the transmission frame according to the DAB standard are designated DAB-MSC in FIG. 4. Because, as mentioned above, the control data is transmitted unchanged in the FIC channel, the known DAB receiver can decode the control data, even if it was generated by X-DAB transmitter 10, and, on the basis of the information contained therein, detect and decode subchannels DAB-MSC transmitted in standard DAB format in the transmission frame. However, it is not possible to decode the XSC channels.

Figure 4:
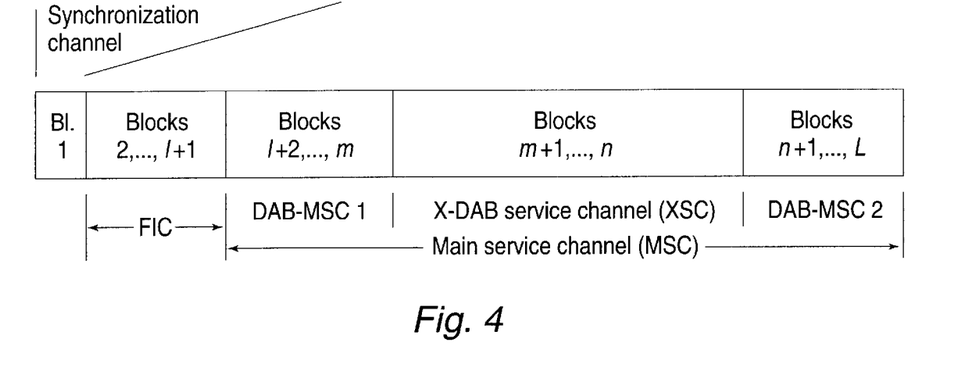
FIG. 4 shows the layout of a transmission frame, applied to the output of an OFDM signal generator, in which both DAB and X-DAB programs can be transmitted.

MSC multiplexer 145, frame multiplexer 150, XSC frame multiplexer 70, and block multiplexer 170 ensure service blocks DAB-MSC or XSC generated in DAB transmitter part 130 and in X-DAB transmitter 10 are inserted into the transmission frame shown in FIG. 4 in a specific order. For example, multiple DAB-MSC blocks are positioned before and after the XSC blocks in main service channel MSC of the transmission frame shown in FIG. 4. Following block multiplexing by block multiplexer 170, the above-mentioned frequency interleaving of the complex symbols in each DAB-MSC and XSC block, differential modulation and the generation of the OFDM signals are carried out together for both block types.

As a result of to this downward-compatible implementation of X-DAB transmitter 10 according to the present invention, data blocks generated by either a DAB transmitter or by X-DAB transmitter 10 can be transmitted in the transmission frame shown in FIG. 4.

Figure 3:
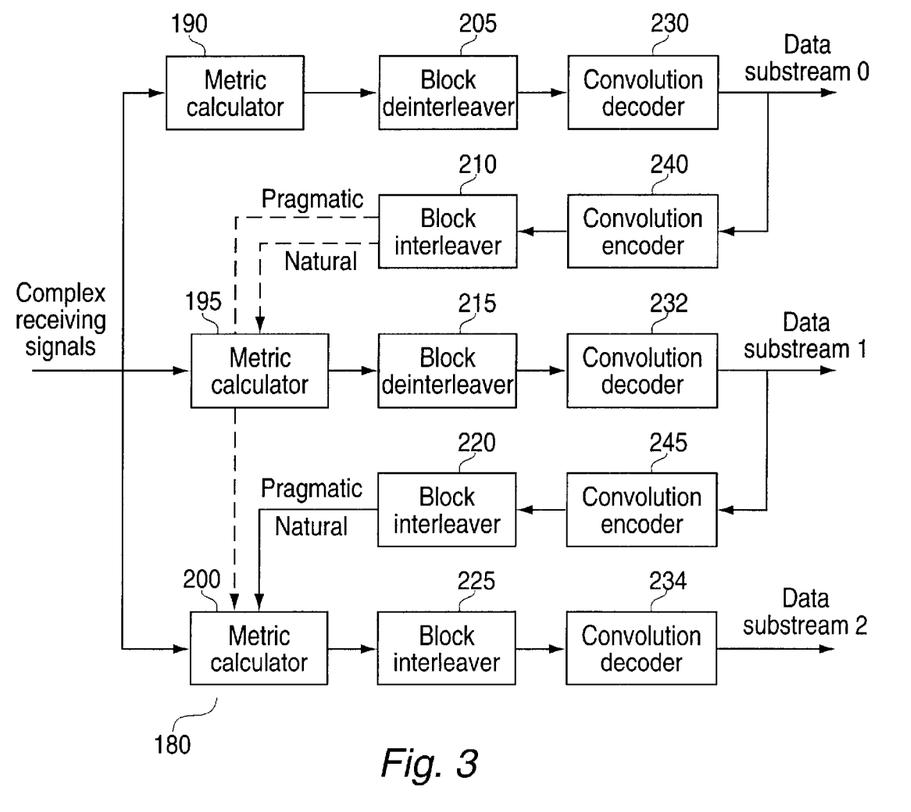
FIG. 3 shows a three-stage decoder for an encoded 8-PSK modulation that can be used in an OFDM multicarrier receiver according to the present invention.

FIG. 3 shows an exemplary three-stage decoder 180 for decoding a data stream which was subjected to an encoded 8-PSK modulation on the transmitter side. Three-stage decoder 180 is an part of a digital OFDM multicarrier receiver according to the present invention, referred to below as X-DAB receiver.

The X-DAB receiver includes the same functional units as a conventional DAB receiver. This includes an OFDM demodulator, composed of an A/D converter and a device for performing a discrete Fourier transform. A differential demodulator and a frequency deinterleaver are connected downstream from the OFDM demodulator. A device for removing the block structure follows the frequency deinterleaver. A sequence of complex symbols is thus present at the output of this device. The complex symbols pass though a demultiplexer which performs time-division demultiplexing of the complex symbols from different source data streams. A downstream time deinterleaver largely functions as a known time deinterleaver of a known DAB receiver, a difference being that it does not process individual bits but rather the complex symbols, i.e., bit groups. A Three-stage decoder 180 shown in FIG. 3, which performs an encoded 8-PSK modulation, is connected downstream from the time deinterleaver in order to decode the X-DAB blocks. Three-stage decoder 180 uses three parallel-connected metric calculators 190, 195, and 200 to recover three data substreams 0, 1, and 2 of the transmitted source data stream. An optional block deinterleaver 205, 215, and 225 can be connected downstream from each metric calculator. Each metric calculator, 190, 195, 200 is connected to a convolution decoder 230, 232, and 234 either directly or via respective block deinterleavers 205, 215, and 225. The outputs of convolution decoders 230, 232, and 234 are fed back to the metric calculators via assigned, complementary convolution encoders 240 and 245, depending on the mapping rule executed by symbol mapper 40 of X-DAB transmitter 10. If symbol mapper 40 performed pragmatic mapping, convolution decoder 230 is fed back to metric calculator 200 via a complementary convolution encoder 240 and a block interleaver 210. Convolution decoder 232 is also fed back to metric calculator 200 via a complementary convolution encoder 245 and a block interleaver 220. If symbol mapper 40 performed natural mapping, convolution decoder 230 must be connected to metric calculator 195 via complementary convolution encoder 240 and block interleaver 210. Convolution decoder 232, in turn, must be connected to metric calculator 200 via complementary convolution encoder 245 and block interleaver 220. The term "metric" refers to the distance from the complex receiving symbols to the decision threshold adapted to the mapping rules on the complex level, possibly weighted by a reliability or channel status flag.

Mention should be made of a further advantage of the X-DAB transmission system according to the present invention over the known DAB transmission system arising when implementing "local windows" in the transmission frame shown in FIG. 4. The OFDM method can be used to set up simultaneous broadcasting networks, which means that the program ensemble is broadcast at the same frequency from adjacent transmitting stations without producing the interference that occurs with a conventional FM broadcasting receiver. In order to emulate a typical FM broadcasting structure with many local programs in a DAB transmission system, a contiguous portion of main service channel MSC of the transmission frame shown in FIG. 4 is removed from the single-frequency broadcasting mode, and the local programs are injected into this local window at the individual transmitting sites. The 4-PSK mapping rule of the DAB standard has a disadvantageous effect here. For example, the 4-PSK symbols on the subcarriers of an OFDM symbol may be assigned to two subchannels, i.e., two different data sources. Consequently, it is not possible to delimit the local window within an OFDM symbol without producing interference. For single-frequency broadcasting, therefore, the range of main service channel MSC is expanded by filler bits until a complete OFDM symbol is occupied.

The X-DAB transmission system according to the present invention avoids this disadvantage by performing the $2^N$-PSK modulation in symbol mapper 40 before time interleaver 60 performs the time interleaving operation, thus establishing a direct connection to the program in question. When implementing local windows, the subchannel limit between single-frequency broadcasting and local programs can thus lie within an OFDM symbol without interfering with single-frequency broadcasting reception. The X-DAB transmission system can therefore be used to implement local windows by making more efficient use of the bandwidth.

Figure 7:
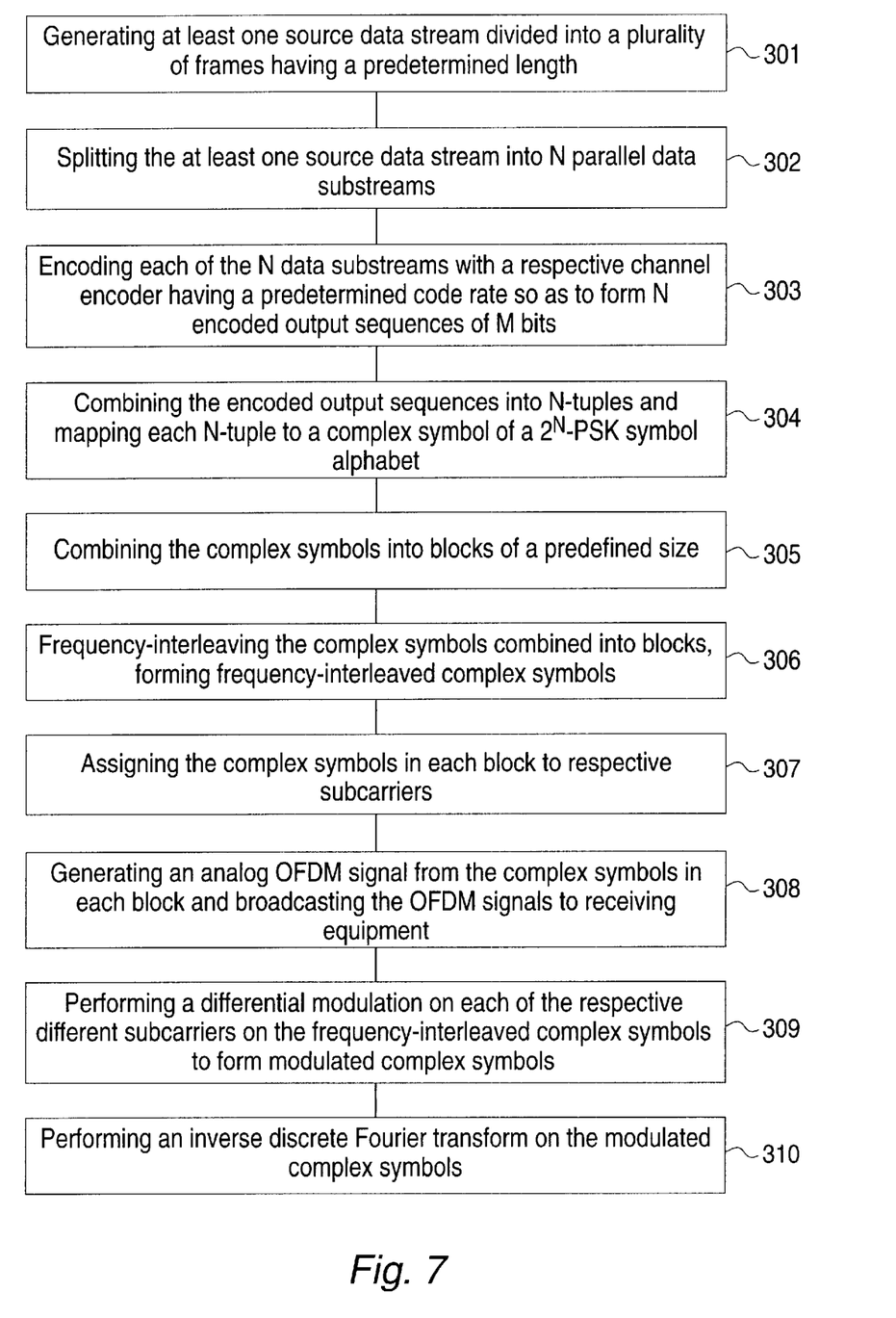
FIG. 7 shows a further example method of the present invention has been added.

FIG. 7 shows a further example method of the present invention. Step 301 includes generating at least one source data stream divided into a plurality of frames having a predetermined length. Step 302 includes splitting the at least on source data stream into N parallel data substreams. Step 303 includes encoding each of the N data substreams with a respective channel encoder having a predetermined code rate so as to form N encoded output sequences of M bits. Step 304 includes combining the encoded output sequences into N-tuple and mapping each N-tuple to a complex symbol of a $2^N$-PSK symbol alphabet. Step 305 includes combining the complex symbols into blocks of a predefined size. Step 306 includes frequency-interleaving the complex symbols combined into blocks, forming frequency-interleaved complex symbols. Step 307 includes assigning the complex symbols in each block to respective subcarriers. Step 308 includes generating an analog OFDM signal from the complex symbols in each block and broadcasting the OFDM signals to receiving equipment. Step 309 includes performing a differential modulation on each of the respective different subcarriers on the frequency-interleaved complex symbols to form modulated complex symbols. Step 310 includes performing an inverse discrete Fourier transform on the modulated complex symbols.

What is claimed is:

1. A method for OFDM multicarrier transmission of digital broadcasting signals comprising:
    generating at least one source data stream divided into a plurality of frames having a predetermined length;
    splitting the at least one source data stream into N parallel data substreams;
    encoding each of the N data substreams with a respective channel encoder having a predetermined code rate so as to form N encoded output sequences of M bits;
    combining the encoded output sequences into N-tuples and mapping each N-tuple to a complex symbol of a $2^N$-PSK symbol alphabet;
    combining the complex symbols into blocks of a predefined size;
    frequency-interleaving the complex symbols in each block to respective subcarriers; and
    generating an analog OFDM signal from the complex symbols, frequency interleaved, in each block and broadcasting the OFDM signals to receiving equipment.

2. The method as recited in claim 1 wherein the digital broadcasting signals include digital added-value services.

3. The method as recited in claim 1 wherein the encoding step includes convolution-encoding.

4. The method as recited in claim 1 further comprising time-interleaving the complex signals resulting from the mapping step.

5. The method as recited in claim 1 further comprising setting N to a value greater than or equal to 3.

6. The method as recited in claim 1 wherein the frequency-interleaving step forms frequency-interleaved complex symbols, and further comprising performing a differential modulation on each of the respective different subcarriers on the frequency-interleaved complex symbols to form modulated complex symbols.

7. The method as recited in claim 6 further comprising performing an inverse discrete Fourier transform on the modulated complex symbols.

8. The method as recited in claim 1 wherein the at least one source data stream includes a plurality of source data streams, and further comprising time-division multiplexing, after the mapping step, the complex symbols originating from the plurality of source data streams.

9. A digital OFDM multicarrier transmission system comprising:
a transmitter including:
at least one set of at least N parallel-connected channel encoders having a predetermined code rate, each channel encoder for encoding one respective data substream of a set of at least one set of N parallel data substreams, each of the at least one set of N parallel data substreams generated by breaking down at least one source data stream divided into a plurality of frames having a predetermined length;
a symbol mapper connected to outputs of the channel encoders for mapping N-bit tuples to complex symbols of a $2^N$-PSK symbol alphabet;
a block generator for combining a predetermined number of the complex symbols into a block;
a multicarrier modulator for modulating the complex symbols combined into the block;
a frequency interleaver connected between the block generator and the multicarrier modulator for frequency-interleaving the complex symbols, which are modulated, in each block; and
a device for generating analog OFDM signals from the complex symbols in each block and for broadcasting the analog OFDM signals.

10. A system as recited in claim 9 wherein the system transmits digital broadcasting signals including digital added-value services.

11. A system as recited in claim 9 further comprising a time interleaver connected downstream from the symbol mapper for time-interleaving the complex symbols.

12. A system as recited in claim 9 wherein each of the complex symbols in each block is assigned to a respective different subcarrier, the multicarrier modulator performing a differential modulation on each subcarrier, and wherein each channel encoder is a convolution encoder.

13. A system as recited in claim 9 wherein the at least one source data stream includes a plurality of source data streams, and further comprising a frame multiplexer for multiplexing the complex symbols originating from the plurality of different source data streams.

14. A system as recited in claim 9 further comprising a block interleaver connected downstream from each channel encoder.

15. A system as recited in claim 9 further comprising:
a block multiplexer; and
a transmitting part connected in parallel with the transmitter, the transmitter part for supplying a blocked 4-PSK symbol stream of the kind produced by a symbol mapper of a known DAB transmitter, the transmitting part being connected to the frequency interleaver via the block multiplexer;
the block generator being attached to the block multiplexer.

16. A system as recited in claim 9 wherein N is greater than or equal to 3.

17. A system as recited in claim 9 wherein the at least one source data stream includes a plurality of source data streams, and further comprising:
a receiver including:
an OFDM demodulator;
a differential demodulator;
a frequency deinterleaver;
a device for de-combining the predetermined number of the complex symbols from the block;
a demultiplexer for time-division demultiplexing the complex symbols originating from the plurality of different source data streams;
a time deinterleaver;
N parallel-connected metric calculators; and
a respective convolution decoder connected downstream from each of the metric calculators, an output of each convolution decoder being fed back to the respective metric calculator via an assigned complementary convolution encoder according to a selected symbol mapping rule.

18. A system as recited in claim 17 further comprising a block deinterleaver connected between each metric calculator and each convolution decoder, and a block interleaver connected between each convolution encoder and the respective metric calculator, each convolution encoder being capable of re-encoding a data bit stream detected.

19. A digital OFDM multicarrier transmitter for use in a digital OFDM multicarrier transmission system, the transmitter comprising:
at least one set of at least N parallel-connected channel encoders having a predetermined code rate, each channel encoder for encoding one respective data substream of a set of at least one set of N parallel data substreams, each of the at least one set of N parallel data substreams generated by breaking down a respective at least one source data stream divided into a plurality of frames having a predetermined length;
a symbol mapper connected to outputs of the channel encoders for mapping N-bit tuples to complex symbols of a $2^N$-PSK symbol alphabet;
a block generator for combining a predetermined number of the complex symbols into a block;
a multicarrier modulator for modulating the complex symbols combined into the block;
a frequency interleaver connected between the block generator and the multicarrier modulator for frequency-interleaving the complex symbols, which are modulated, in each block; and
a device for generating analog OFDM signals from the complex symbols in each block and for broadcasting the analog OFDM signals.

20. A transmitter as recited in claim 19 wherein the transmission system transmits digital broadcasting signals including digital added-value services.

21. A transmitter as recited in claim 19 further comprising a time interleaver connected downstream from the symbol mapper for time-interleaving the complex symbols.

22. A transmitter as recited in claim 19 wherein each of the complex symbols in each block is assigned to a respective different subcarrier, the multicarrier modulator performing a differential modulation on each subcarrier, and wherein each channel encoder is a convolution encoder.

23. A transmitter as recited in claim 19 wherein the at least one source data stream includes a plurality of source data streams, and further comprising:
 a receiver including:
  an OFDM demodulator;
  a differential demodulator;
  a frequency deinterleaver;
  a device for removing the predetermined number of the complex symbols from the block;
  a demultiplexer for time-division demultiplexing the complex symbols from the plurality of source data streams;
  a time deinterleaver;
  N parallel-connected metric calculators; and
  a respective convolution decoder connected downstream from each of the metric calculators, an output of each convolution decoder being fed back to the respective metric calculator via an assigned complementary convolution encoder according to a select symbol mapping rule.

* * * * *